(12) United States Patent
Dornbach

(10) Patent No.: US 8,788,506 B1
(45) Date of Patent: Jul. 22, 2014

(54) METHODS AND SYSTEMS FOR ESTIMATING A COUNT OF UNIQUE ITEMS

(75) Inventor: Peter Dornbach, Adliswil (CH)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/476,726

(22) Filed: May 21, 2012

(51) Int. Cl.
*G06F 12/00* (2006.01)

(52) U.S. Cl.
USPC .............. 707/747; 711/E12.069; 711/E12.07; 711/170

(58) Field of Classification Search
USPC .......................................... 711/170; 707/747
See application file for complete search history.

(56) References Cited

PUBLICATIONS

Flajolet, et al, "HyperLogLog: the analysis of a near-optimal cardinality estimation algorithm", Proceedings of the 2007 International Conference on Analysis of Algorithms, May 17, 2007, 18 pages.

*Primary Examiner* — Reginald Bragdon
*Assistant Examiner* — Hamdy S Ahmed
(74) *Attorney, Agent, or Firm* — Brake Hughes Bellermann LLP

(57) ABSTRACT

According to one general aspect, a method is provided for managing memory when counting unique items, the method using a pattern of bits in a unique estimator mask. The method may create a unique estimator mask based on fingerprints calculated for previously encountered items, and determine a number with the highest probability for creating the pattern of bits in the mask. When the number with the highest probability is determined, it may be returned as the estimated count of unique items.

21 Claims, 4 Drawing Sheets

METHODS AND SYSTEMS FOR ESTIMATING A COUNT OF UNIQUE ITEMS

TECHNICAL FIELD

This disclosure generally relates to estimating a count of unique items, and in particular to the use of memory-conscious techniques to approximate a count of unique items.

BACKGROUND

Many organizations have a need to track the number of times a unique value occurs for another given value (i.e. a key value). For example, to detect malicious Domain Name Service ("DNS") requests, it may be desirable to know how many unique IP addresses are requesting a particular Uniform Resource Locator ("URL"). Alternatively, to assist in the creation of an index for searching document repositories, or to create search results for an Internet search it may be beneficial to count the number of unique URLs for documents that contain an n-gram of words (also referred to a shingle). An n-gram is a group of n sequential words, where n is a number, usually between 2 and 8, although it can be any number. In order to count unique items, a system must remember what items have already been encountered. For example, to determine whether a specific shingle has been seen in contents for a document associated with a URL, the system needs to determine if the URL has already been seen and counted for that shingle.

One method of counting unique items is to store each item as it is encountered with the key in an index table, so that the table includes a row for each item-key pair. But this method requires a large amount of storage. To reduce the amount of memory required to store a row in such a table, some systems may store a fingerprint of the item in the index. A fingerprint is a much smaller unique code generated from a larger data item. For example, a fingerprint of a few bits may be generated from the characters comprising a URL. However, for an index with hundreds of billions of records, even the memory savings of using a fingerprint may be inadequate because each key value will still require one record in the index for each unique fingerprint.

SUMMARY

According to one general aspect, a computer-implemented method for managing memory while counting unique items includes receiving a request from a computing system for an estimated count of the unique items for a particular key value and receiving a unique estimator mask for the particular key value from a memory, the unique estimator mask having a number of bits, at least some of the bits being non-zero and at least some of the bits being zero based on fingerprints calculated from previously encountered items, the non-zero bits and the zero bits forming a pattern. The method may also include calculating a first probability that a particular number of encountered items created the pattern of non-zero bits and zero bits and determining whether the first probability for the particular number is less than a first probability for another number that is one less than the particular number The method further includes identifying the another number as the estimated count of unique items when it is determined that the first probability for the particular number is less than the first probability for the another number and providing the estimated count to the computing system as a response to the request. In some implementations, the bit of the unique estimator mask may be set to non-zero when a position of the bit matches the first occurrence of a non-zero bit in a fingerprint for one of the previously encountered items.

According to another general aspect, calculating the first probability may include initializing the first probability to one ("1") and repeating, for each bit position in the mask, the operations of: calculating a second probability that the bit at the position is non-zero, multiplying the first probability by the second probability when the bit at the position is zero, and multiplying the first probability by the difference between the second probability and one ("1") when the bit at the position is non-zero. In some implementations calculating the second probability may include determining that $p_i$ equal to $(1-0.5^{i+1})^n$, where i is the bit position and n is the particular number of items.

According to yet another general aspect, a tangible computer-readable storage medium including recorded and stored instructions is described. The instructions, when executed by one or more processors of a computer system, may cause the computer system to receive a request from a computing system for an estimated count of the unique items for a particular key value and receive a unique estimator mask for the particular key value from a memory, the unique estimator mask having a number of bits, at least some of the being non-zero and at least some of the bits being zero based on fingerprints calculated from previously encountered items, the non-zero bits and the zero bits forming a pattern. The instructions may further cause the computer system to calculate a first probability that a particular number of encountered items created the pattern of non-zero bits and zero bits and determine whether the first probability for the particular number is less than a first probability for another number that is one less than the particular number. The instructions may also cause the computer system to identify the another number as the estimated number of unique items encountered when it is determined that the first probability for the particular number is less than the first probability for the another number and provide the estimated count of unique items to the computing system as a response to the request. In some implementations, the bit of the unique estimator mask may be non-zero when a position of the bit matches the first occurrence of a non-zero bit of a fingerprint for one of the previously encountered items.

According to yet another general aspect, a system may include a memory configured to store executable code, and a processor operably coupled to the memory. The processor may be arranged and configured to execute the code to receive a request from a computing system for an estimated count of the unique items for a particular key value and receive a unique estimator mask for the particular key value from a memory, the unique estimator mask having a number of bits, at least some of the bits being non-zero and at least some of the bits being zero based on fingerprints calculated from previously encountered items, the non-zero bits and the zero bits forming a pattern. The processor may further execute the code to calculate a first probability that a particular number of encountered items created the pattern of non-zero bits and zero bits and determine whether the first probability for the particular number is less than a first probability for another number that is one less than the particular number. In some implementations, as part of calculating the first probability the processor may further execute the code to initialize the first probability to one ("1") and repeat, for each bit position in the mask, the operations of: calculating a second probability that the bit at the position has a non-zero value, multiplying the first probability by the second probability when the bit at the position has a zero value, and multiplying the first probability by the difference between the second probability and one ("1") when the bit at the position has a non-zero value. The processor may further execute the code to identify the another number as the estimated number of unique items encountered when it is determined that the first probability for the particular number is less than the first probability for the another number and provide the estimated count of unique items to the computing system as a response to the request. In some implementations, a bit of the unique estimator mask may be non-zero when a position of the bit matches the first occurrence of a non-zero bit of a fingerprint for one of the previously encountered items.

Implementations can include one or more of the following features. For example, the encountered items may be uniform resource locators, and the fingerprint may be calculated from the characters comprising the encountered URL. As another example, system may repeat the calculating of the first probability and determining whether the first probability for the particular number is less than the first probability for the another number, beginning with the particular number being zero and increasing the particular number each time the calculating and determining are repeated. The system may also terminate the repeating of the calculating and the determining as part of the identifying.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
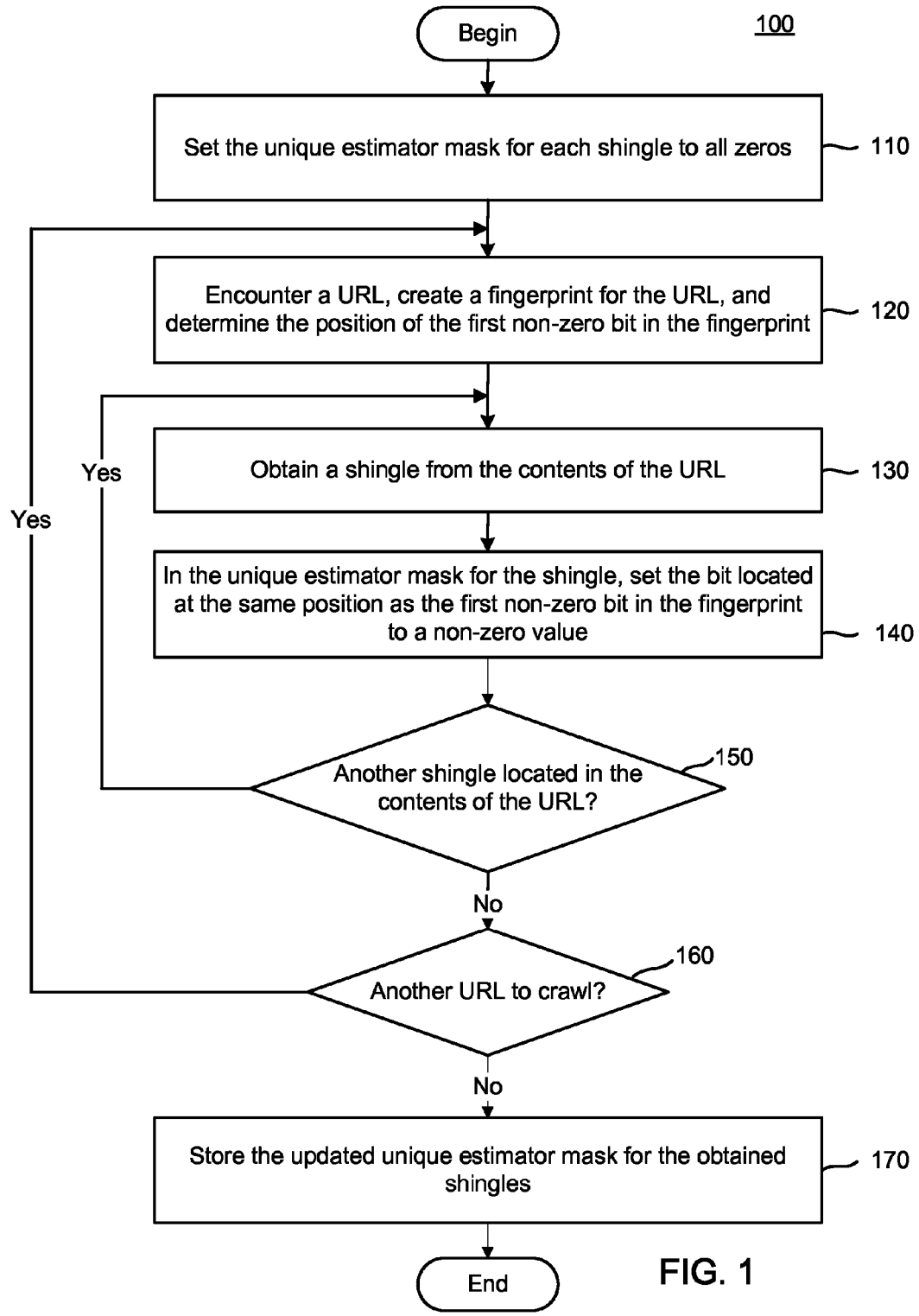
FIG. 1 illustrates a flow diagram of a process for creating a unique estimator mask for a key value, consistent with some implementations.

In some implementations provide a memory-conscious method of tracking the occurrence of unique items. For systems that process and store millions of records (or more), memory management may take priority over precision. For example, a system storing billions of records may trade memory savings, in the form of smaller storage requirements, for an exact count of unique items. In such a system, a comparatively small unique estimator mask may replace the need to store a record for each unique data item.

In some implementations, a unique estimator mask of, for example, 32 bits may be used to detect the number of unique data items that occur for a given key value. A key value may be any data item for which a count of unique items is required. For example, a key value may represent a URL if the process is counting the number of unique IP addresses that request the URL. A key value may also represent a shingle if the process is counting the number of unique URLs for documents that contain an occurrence of the shingle. A shingle may be a pair of words, sequence of multiple words, or n-grams. For example, an Internet search engine that crawls thousands of documents, such as web pages, for cataloging and indexing may need to count the number of unique URLs for documents that contain a particular shingle. Because web pages often link to each other, a single web page, identified by a URL, may be retrieved multiple times during a crawl. In such a system it is important not to double-count a particular web page that has been encountered before.

To accommodate this need, and to manage memory, when a shingle is found in the contents of a web page for a URL, rather than storing the URL-shingle pair in a table (resulting in potentially millions of records for each shingle), in some implementations may populate and store a unique estimator mask for the shingle. This results in only one record per shingle, a vast memory savings over storing multiple rows per shingle. The pattern of bits in the unique estimator mask for each key value (e.g. each shingle) may be populated based on the fingerprints of the items (e.g. URLs) encountered.

At any time after populating the unique estimator mask using fingerprints of the encountered items, in some implementations may use the unique estimator mask to calculate an estimated number of counted items represented by the pattern of the bits in the mask. This may be accomplished by computing the number that has the highest probability of producing the pattern of bits in the unique estimator mask. In some implementations, the number with the highest probability is considered the estimate of the count of unique items. The search engine may use the estimated count of unique items to facilitate the creation of an index of documents, or to generate more accurate search results for a query to the index. For example, shingles with an extraordinarily high number of unique items may be considered "noise" in a query and, thus, ignored. Such counting of unique items may also be useful in other situations.

FIG. 1 illustrates a flow diagram of a process 100 for creating a unique estimator mask for a key value, consistent with some implementations. Process 100 may be used by a unique estimator system that, for example, counts the number of unique URLs for documents that contain an occurrence of a specific shingle. A unique estimator system, such as system 400 or 450 shown in FIG. 4, may include a computing system with a processor and a unique estimator module that contains instructions executed by the processor. In a unique estimator system that counts unique URLs for a shingle, the unique estimator mask may be stored in memory as an attribute of a shingle. In the implementation depicted in FIG. 1, the unique estimator system counts the number of unique URLs for documents that contain a shingle, but implementations are not limited to counting such URLs.

The unique estimator system may initialize the unique estimator mask (step 110) for each key (e.g. each shingle) to zero. When set to zero, the unique estimator mask indicates that no items have been encountered for the key value. The unique estimator system may initialize the unique estimator mask once, so that the estimated count of items is cumulative, or the unique estimator system may initialize the unique estimator mask at certain time periods or before certain events. For example, in implementations where the unique estimator system initializes the unique estimator mask each day, the estimated count is a daily count. Thus, the unique estimator mask may be re-set as required by the system.

The unique estimator system may begin crawling a corpus of documents for documents associated with document identifiers (step 120). For example, the unique estimator system may crawl the Internet for documents located at particular URLs. Step 120 may encompass any method of encountering items to be counted and is not limited to crawling the Internet. For example, the unique estimator system may read DNS request records, read source code from a source code repository, or read documents from an internal document management system. When the unique estimator system encounters a URL it may create a fingerprint for the URL. The fingerprint may be created using any of several known functions for creating unique strings from a larger value, including cryptographic and polynomial hashes. After creating the fingerprint for the URL, the unique estimator system may determine the position of the first non-zero bit in the footprint.

Figure 2:
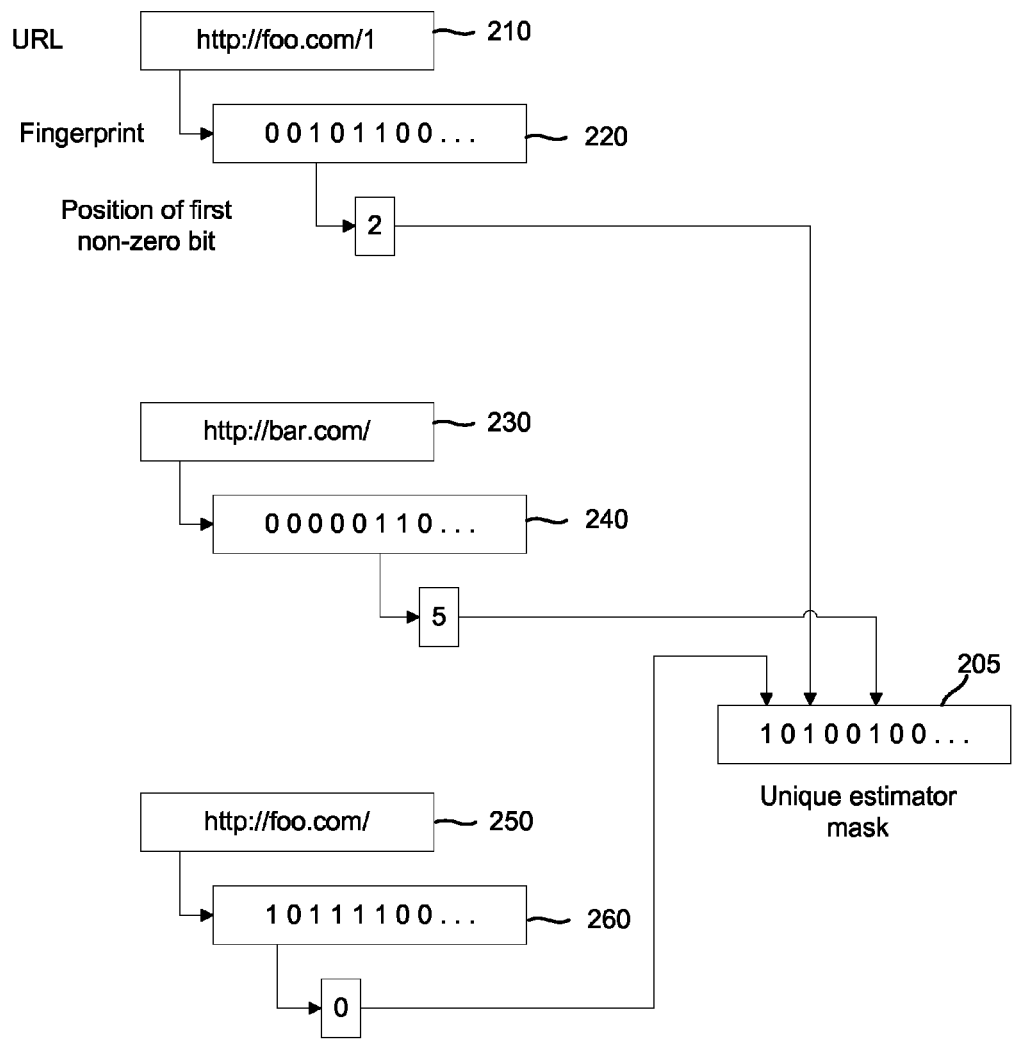
FIG. 2 is an example of data items used to create an exemplary unique estimator mask.

FIG. 2 is an example of data items used to create an exemplary unique estimator mask. For example, the unique estimator system may encounter URL 210, entitled "http://foo.com/1." The unique estimator system may use a fingerprint function to generate fingerprint 220 for URL 210. In the example of FIG. 2, fingerprint 220 has the first non-zero bit in position 2.

Returning to FIG. 1, the unique estimator system parses the contents of the web page associated with the URL for shingles and obtains a shingle from the contents (step 130). When a shingle is encountered and obtained from the web page the unique estimator system may retrieve the unique estimator mask for the encountered shingle. As previously discussed, the unique estimator mask may be stored in a memory as an attribute of the shingle. The unique estimator system may locate the same bit position in the retrieved unique estimator mask as the bit position found in step 120 for the URL and set that bit to a non-zero value (step 140). For example, as shown in FIG. 2, the unique estimator system may locate the bit in the second position of the unique estimator mask 205 and set that bit to a non-zero value.

The unique estimator system may continue to parse the contents of the document associated with the URL for additional shingles (step 150). If another shingle is located (step 150, Yes), then steps 130 and 140 may be repeated with the unique estimator mask for the additional located shingles. If no more shingles exist (step 150, No) then the crawl for additional URLs continues. If additional URLs are found (step 160, Yes), then steps 120 to 150 may be repeated for the additional URL and the shingles located in contents associated with the additional URL. For example, as shown in FIG. 2, the unique estimator system may encounter URL 230 and URL 250. The unique estimator system may calculate fingerprint 240 for URL 230 and determine that the first non-zero bit of fingerprint 240 is the $5^{th}$ position. Accordingly, when the unique estimator system locates the shingle that was found in contents associated with URL 210 in the contents associated with URL 230, the unique estimator system will set the $5^{th}$ bit position of unique estimator mask 205 to a non-zero value. Similarly, the unique estimator system may calculate fingerprint 260 from URL 250, determining that the bit in the zero position is non-zero. When the same shingle is encountered in the contents associated with URL 250 that was also found in contents associated with URLs 210 and 230, the unique estimator system sets the bit in the zero position of the unique estimator mask 205 to a non-zero value. In general, during the crawl the same URL will be encountered more than once.

When the unique estimator system finishes the crawl of URLs (step 160, No) then the unique estimator system stores the updated unique estimator masks for the shingles (step 170) and process 100 ends. The unique estimator masks now contain a pattern of zero and non-zero bits that can be used to determine an estimated number of unique items encountered.

Figure 3:
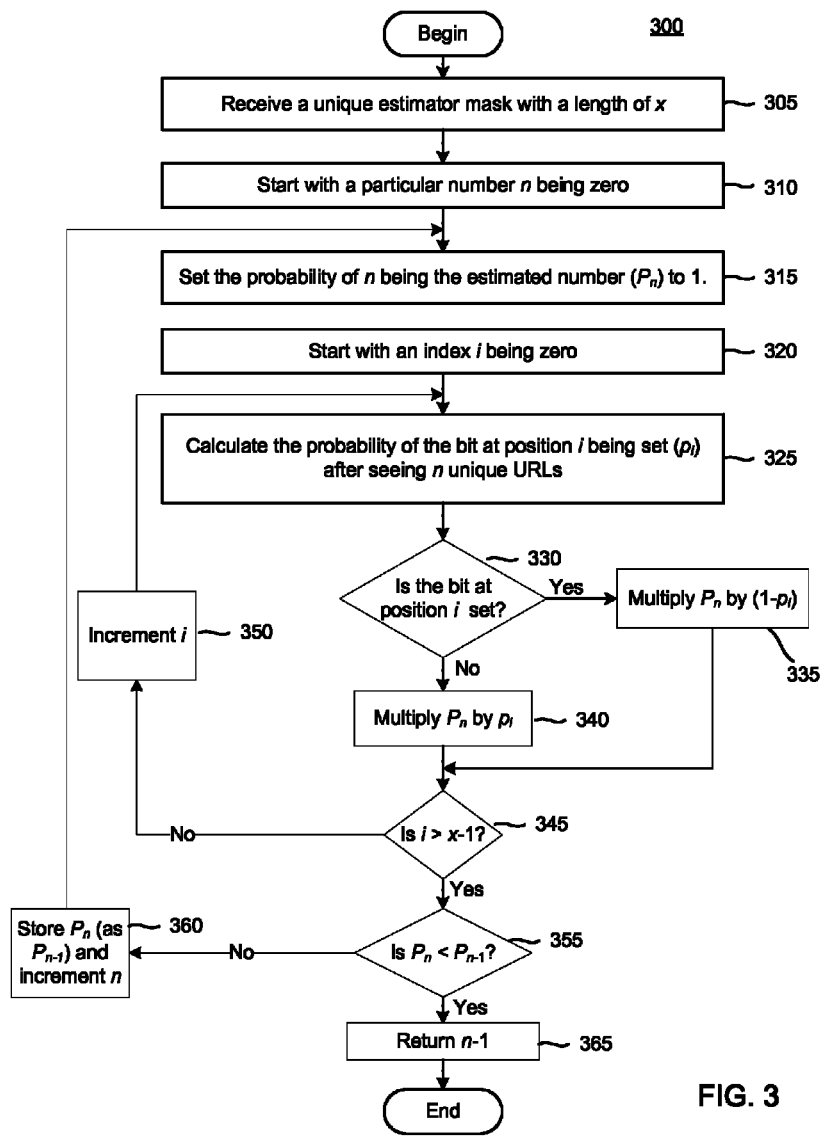
FIG. 3 illustrates a flow diagram of a process for estimating a count of unique items represented by the unique estimator mask, consistent with some implementations.

FIG. 3 illustrates a flowchart of a process 300 for estimating a count of unique items represented by a unique estimator mask, consistent with some implementations. The flowchart shown in FIG. 3 may be performed at least in part by a unique estimator system (e.g., the system 400 or 450 shown in FIG.

4). As shown in FIG. 3, the unique estimator system receives a unique estimator mask (step 305). The unique estimator mask may have been populated by, for example, process 100 and have a length of x bits. For example the length of the mask may be 32 bits. In some implementations the length of the unique estimator mask may be based on the maximum length of the fingerprint generated for one of the unique items. The unique estimator system may initialize a variable n to zero (step 310) and then begin a loop that will determine the number that has the highest probability of producing the pattern of zero and non-zero bits in the unique estimator mask. To accomplish this, the unique estimator system may initialize the probability that the number n is the estimated number ($P_n$) to one (step 315).

The unique estimator system may then adjust the value of $P_n$. To adjust the value of $P_n$, the unique estimator system may loop through each bit in the unique estimator mask using an index i, and calculate the probability that the bit at position i ($p_i$) is non-zero after seeing n unique items (step 325). In other words, if the value of n is 5 and the mask has 32 bits, the unique estimator system may perform a probability calculation 32 times, once for each of the 32 bits, that the particular bit has a non-zero value after counting 5 unique items. In some implementations, this probability may be calculated using the formula $p_i=(1-0.5^{i+1})^n$, where i is the bit position under consideration (i.e. associated with the probability being calculated) and n is the particular number of items. Using the example above where n is 5, if the unique estimator is calculating the probability for the bit in the $6^{th}$ position, the probability would be $(1-0.5^7)^5$ or 0.9615431.

The unique estimator system may determine whether the bit at position i has a non-zero value (step 330). If the bit at the particular position is not zero (step 330, Yes), then the unique estimator system may multiply $P_n$ by $(1-p_i)$(step 335). For example, if the bit at the $6^{th}$ position is a one and the value of $P_n$ is currently 0.634, the unique estimator system may multiply 0.634 by (1−0.9615431), resulting in a new value of 0.0243816746 for $P_n$. On the other hand, if the bit at the particular position is zero (step 330, No), then the unique estimator system may multiply $P_n$ by $p_i$ (step 340). For example, if the bit at the $6^{th}$ position is a zero, the unique estimator system may multiply 0.634 by 0.9615431, resulting in a new value of 0.6096183254 for $P_n$.

The unique estimator system may determine whether all the bits in the unique estimator mask have been considered (step 345). If not all the bits have been considered (step 345, No), then i, which represents the position of the bit being considered, is incremented and steps 325 to 345 are repeated for the new bit position. If all bits have been considered (step 345, Yes), then the unique estimator system may compare (step 355) the value of $P_n$ with the probability that the number n−1 is the estimated number ($P_{n-1}$). If the value of $P_n$ is the same as or greater than $P_{n-1}$ (step 355, No) then the unique estimator system may store the probability $P_n$ as $P_{n-1}$ (to be used in the next iteration of the loop) and increment the value of n. and repeat steps 315 to 355 with the new value of n. When n is zero, $P_{n-1}$ will also be zero and, therefore, cannot be larger than $P_n$. However, for any iteration of steps 315 to 355 after n=0, $P_{n-1}$ may in fact be larger than P. If $P_{n-1}$ is larger than $P_n$ (step 355, Yes), then the unique estimator system has found the number with the highest probability of producing the pattern of bits in the unique estimator mask. Accordingly, unique estimator system returns the number one less than n (i.e. n−1) as the estimate of the number of items encountered (step 365) and process 300 ends.

The process shown in FIG. 3 is an example of one implementation, and may have steps deleted, reordered, or modified. For example, steps 325 to 340 may be performed in separate loops of index i with each $p_i$ temporarily stored in memory.

Figure 4:
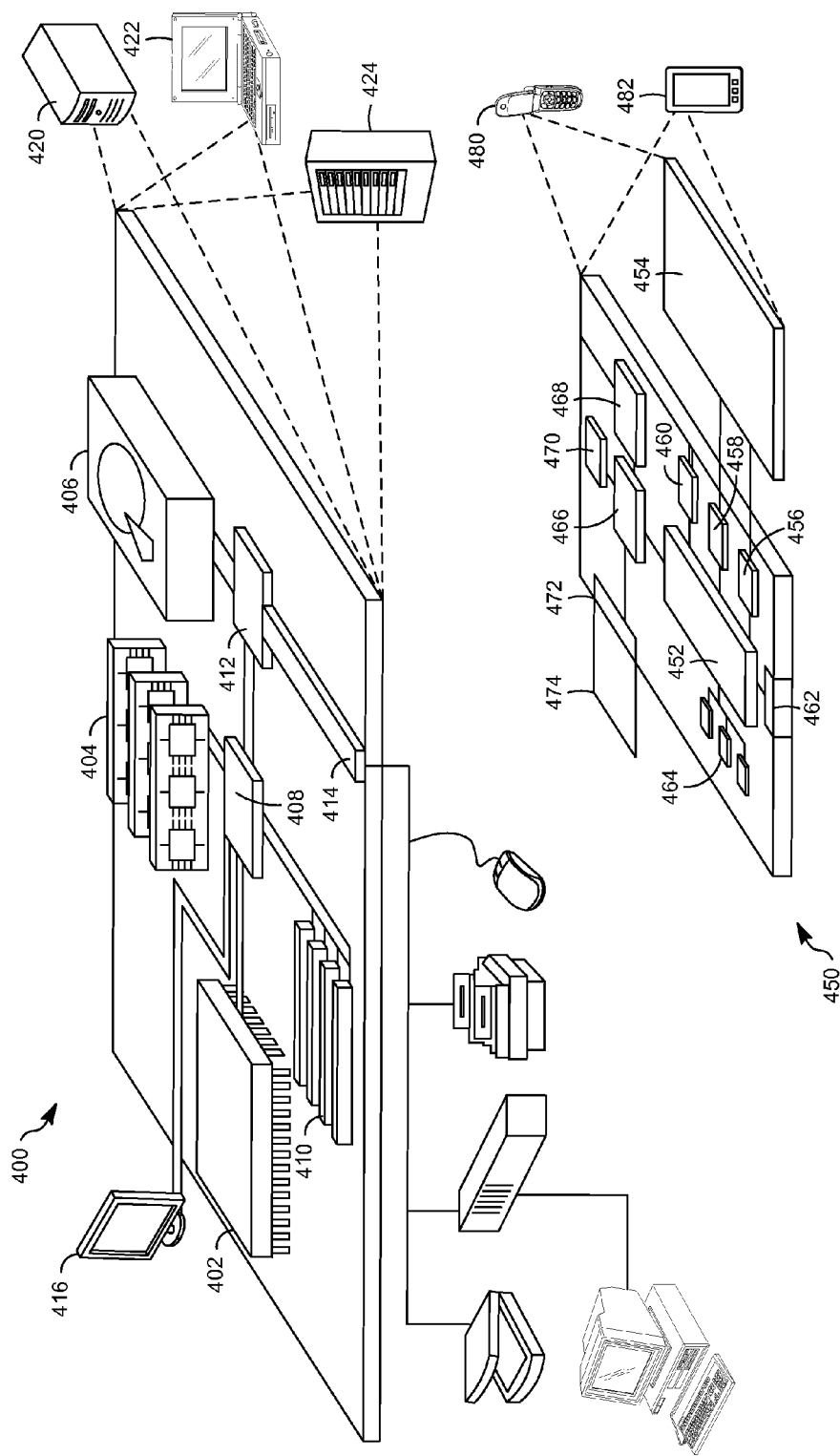
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, netbooks, tablets, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes—a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for managing memory usage when counting unique items, comprising:
   receiving a request from a computing system for an estimated count of the unique items for a particular key value
   receiving a unique estimator mask associated with the particular key value from a memory device, the unique estimator mask having a number of bits, at least some of the bits being non-zero and at least some of the bits being zero based on fingerprints calculated from previously-encountered items, the non-zero bits and the zero bits forming a pattern;
   calculating, by one or more processors, a first probability that a particular number of encountered items created the pattern of non-zero bits and zero bits of the mask;
   determining whether the first probability for the particular number is less than a first probability for another number that is one less than the particular number;
   identifying the another number as the estimated count of the unique items when it is determined that the first probability for the particular number is less than the first probability for the another number; and
   providing the estimated count of the unique items to the computing system as a response to the request.

2. The method of claim 1, wherein calculating the first probability includes:
   initializing the first probability to 1; and repeating, by the one or more processors, for each bit position in the mask, the operations of:
- calculating a second probability that a bit at the position has a non-zero value,
- when the bit at the position has a non-zero value, multiplying the first probability by (1 minus the second probability), and
- when the bit at the position has a zero value, multiplying the first probability by the second probability.

3. The method of claim 2, wherein calculating the second probability ($p_i$) for each bit position in the mask includes determining that $p_i$ is equal to $(1-0.5^{i+1})^n$, where i is the bit position and n is the particular number.

4. The method of claim 1, wherein a bit of the mask is non-zero when a position of the bit matches a position of the first occurrence of a non-zero bit of a fingerprint for one of the previously encountered items.

5. The method of claim 1, wherein the previously encountered items are uniform resource locators (URLs).

6. The method of claim 5, wherein the fingerprints are calculated from characters of the URLs.

7. The method of claim 1, wherein after receiving the mask, calculating the first probability and the determining are repeated, beginning with the particular number being zero and increasing the particular number each time the calculating and determining are repeated.

8. The method of claim 7, wherein the identifying further includes:
- terminating the repeating of the calculating and the determining.

9. A non-transitory computer-readable storage medium for managing memory usage when counting unique items, the storage medium having recorded and embodied thereon instructions that, when executed by one or more processors of a computer system, cause the computer system to:
- receive a request from a computing system for an estimated count of the unique items for a particular key value;
- receive a unique estimator mask associated with the particular key value from a memory device, the unique estimator mask having a number of bits, at least some of the bits being non-zero and at least some of the bits being zero based on fingerprints calculated from previously encountered items, the non-zero bits and the zero bits forming a pattern;
- calculate a first probability that a particular number of encountered items created the pattern of non-zero bits and zero bits of the mask;
- determine whether the first probability for the particular number is less than a first probability for another number that is one less than the particular number;
- identify the another number as an estimated count of unique items when it is determined that the first probability for the particular number is less than the first probability for the another number; and
- provide the estimated count of unique items to the computing system as a response to the request.

10. The storage medium of claim 9, wherein calculating the first probability includes:
- initializing the first probability to 1, and
- repeating, for each bit position in the mask, the operations of:
  - calculating a second probability that a bit at the position has a non-zero value,
  - when the bit at the position has a non-zero value, multiplying the first probability by (1 minus the second probability), and
  - when the bit at the position has a zero value, multiplying the first probability by the second probability.

11. The storage medium of claim 10, wherein calculating the second probability ($p_i$) for each bit position in the mask includes determining that $p_i$ is equal to $(1-0.5^{i+1})^n$, where i is the bit position and n is the particular number.

12. The storage medium of claim 9, wherein a bit of the mask is non-zero when a position of the bit matches a position of the first occurrence of a non-zero bit of a fingerprint for one of the previously encountered items.

13. The storage medium of claim 9, wherein the previously encountered items are uniform resource locators (URLs).

14. The storage medium of claim 9, wherein after receiving the mask, the instructions further cause the one or more processors to repeat calculating the first probability and determining whether the first probability for the particular number is less than the first probability for the another number, beginning with the particular number being zero and increasing the particular number each time the calculating and determining are repeated.

15. The storage medium of claim 14, wherein as part of the identifying the instructions further cause the one or more processors to:
- terminate the repeating of the calculating and the determining.

16. A system for managing memory usage when counting unique items comprising:
- a memory configured to store executable code; and
- a processor operably coupled to the memory, the processor configured to execute the code to:
  - receive a request from a computing system for an estimated count of the unique items for a particular key value;
  - receive a unique estimator mask associated with the particular key value from a memory, the unique estimator mask having a number of bits, at least some of the bits being non-zero and at least some of the bits being zero based on fingerprints calculated from previously encountered items, the non-zero bits and the zero bits forming a pattern,
  - calculate a first probability that a particular number of encountered items created the pattern of non-zero bits and zero bits;
  - determine whether the first probability for the particular number is less than a first probability for another number that is one less than the particular number,
  - identify the another number as the estimated count of the unique items when it is determined that the first probability for the particular number is less than the first probability for the another number; and
  - provide the estimated count of the unique items to the computing system as a response to the request.

17. The system of claim 16, wherein calculating the first probability includes:
- initializing the first probability to 1; and
- repeating, for each bit position in the mask, the operations of:
  - calculating a second probability that a bit at the position has a non-zero value,
  - when the bit at the position has a non-zero value, multiplying the first probability by (1 minus the second probability), and
  - when the bit at the position has a zero value, multiplying the first probability by the second probability.

18. The system of claim 17, wherein as part of calculating the second probability ($p_i$) for each bit position in the mask the processor executes code to determine that $p_i$ is equal to $(1-0.5^{i+1})^n$, where i is the bit position and n is the particular number.

19. The system of claim 16, wherein a bit of the mask is non-zero when a position of the bit matches a position of the first occurrence of a non-zero bit of a fingerprint for one of the previously encountered items.

20. The system of claim 16, wherein after receiving the mask, the processor is further configured to execute the code to repeat calculating the first probability and determining whether the first probability is less than the first probability for the another number, beginning with the particular number being zero and increasing the particular number each time the calculating and determining are repeated.

21. The system of claim 20, wherein as part of the identifying, the processor is further configured to execute the code to terminate the repeating of the calculating and the determining.

* * * * *